INVENTORS
ERNEST W. BLATTNER
KAROL PILARCZYK &
MICHAEL TOTH, Jr.
BY

ATTORNEYS

April 30, 1968     E. W. BLATTNER ETAL     3,380,711

COMBINED SEPARATOR AND TURBINE

Filed Jan. 21, 1966     2 Sheets-Sheet 2

INVENTORS
ERNEST W. BLATTNER
KAROL PILARCZYK &
MICHAEL TOTH, Jr.

ATTORNEYS

United States Patent Office 3,380,711
Patented Apr. 30, 1968

3,380,711
COMBINED SEPARATOR AND TURBINE
Ernest W. Blattner, Franklin, Karol Pilarczyk, Morrisville, and Michael Toth, Jr., Fallsington, Pa., assignors to De Laval Turbine Inc., Trenton, N.J., a corporation of Delaware
Filed Jan. 21, 1966, Ser. No. 522,091
6 Claims. (Cl. 253—76)

ABSTRACT OF THE DISCLOSURE

A combined turbine and centrifugal dust separator in which the dust particles are separated in the region between the discharge of the centrifugal separator and the inlet to the turbine whereby the high velocity in the separator is continued as a velocity of approach to the turbine nozzles.

This invention relates to a combined separator and turbine and more specifically to a combination centrifugal dust separator and a turbine which receives flow having a susbtantial radial component, i.e., a turbine of radial or mixed flow type.

In connection with catalytic cracking, regeneration of the catalytic beds involves the burning off of deposited carbon by air which produces hot gases suitable for the driving of gas turbines to furnish either compressed air or electrical power. A problem incurred with systems of this type is that the hot gases contain particles of the catalyst which are hard and highly abrasive. It is therefore necessary to remove the particles (dust) before the gases enter the turbine because the particles would erode various parts of the turbine. Heretofore, dust separators have been provided to remove the major portion of the dust in order to provide gas acceptable for turbine drive. However, conventional separators do not utilize very high velocities (which are best for separation) since the kinetic energy cannot is recovered.

In accordance with the invention there is provided a direct combination of a dust separator with a turbine. The gas containing the dust enters a volute or other chamber in which rotary flow occurs to throw the dust outwardly centrifugally. A small part of the gas containing the major portion of the dust is bled off to the periphery of the separator chamber and the remainder passes to the turbine. This provides a very efficient system because the high velocity involved desirably in the separation is not lost but is continued as a velocity of approach to the turbine nozzles to augment the spouting velocity to the periphery of the turbine wheel. In other words, the kinetic energy of the gas, imparted for achievement of effective dust separation is not lost by a retransformation involving decrease of velocity but is carried to the nozzles wherein further transformation is effected to provide the proper feed to the turbine blading.

It is the general object of this invention to provide a combined dust separator and radial or mixed inflow turbine which achieves the above-discussed advantages in efficiency and simplicity of construction.

The above and other objects and features of the invention will become apparent from a consideration of the following description in conjunction with the accompanying drawings, wherein.

Figure 1:
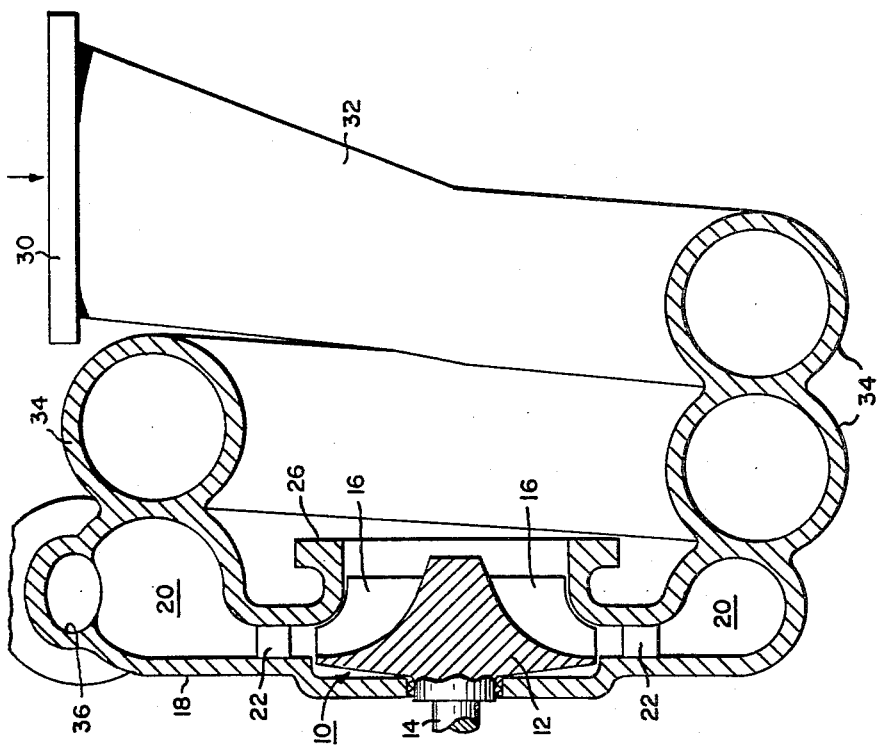
FIGURE 1 is an axial section thorugh a combined dust separator and radial inflow turbine provided in accordance with the invention.
Figure 2:
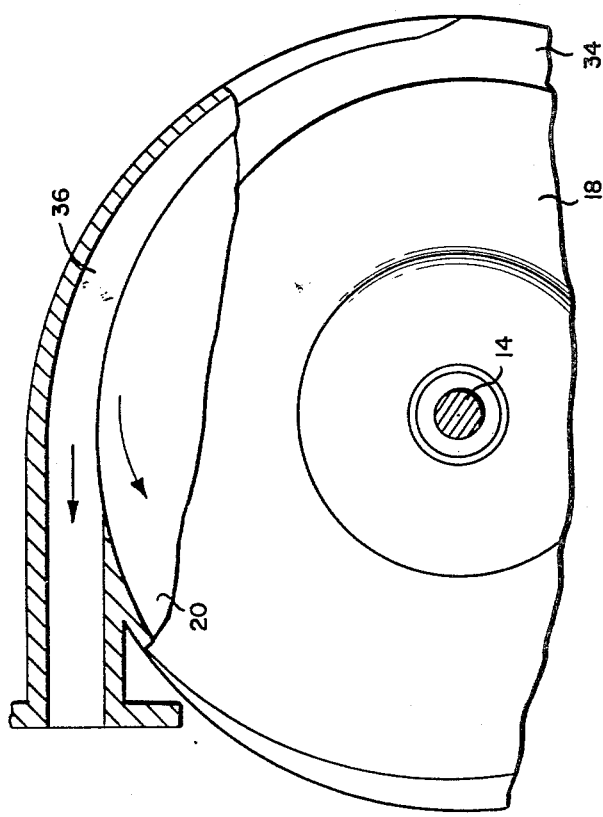
FIGURE 2 is a fragmentary elevation of the same, with parts broken away, looking at the left of FIGURE 1.

Referring to FIGURES 1 and 2, there is shown a turbine-separator unit comprising a turbine stage of the radial inflow type including a turbine wheel 10 having a hub 12 secured to a shaft 14. The shaft 14 is journalled in suitable bearings (not shown) and provides a mechanical output which can be used for various purposes such as driving a compressor or producing electrical power. The hub 12 carries the usual turbine blades 16 constructed in a well-known manner and is adapted to rotate within a central portion of the turbine casing 18.

The turbine casing 18 is of the conventional scroll type providing an inlet chamber 20 for directing the flow of gas into the peripherally arranged nozzles 22 directing the gas to the turbine blades with a radially inward component of flow. The gas leaves the turbine blading 16 in a generally axial direction through the outlet connection 26 to which a suitable diffuser section (not shown) is connected. The construction and operation of the radial inflow turbine described above is conventional and further detailed description thereof is unnecessary. The invention is equally applicable to turbines of the mixed flow type.

The dust separator section of the unit is formed as a conduit preceding the turbine casing 18 and is connected to the supply of dust-containing gas at an inlet connection 30. The separator comprises an accelerator section 32 which reduces in cross-sectional area in the direction of flow in order to accelerate the gas to a velocity providing good separation but below the critical wearing velocity of the separator parts; i.e. a nozzle is provided effecting a partial transformation of the energy of the gas into velocity. Connected between the inlet section 32 and the turbine inlet chamber 20 is the intermediate casing section 34 which is formed to provide a helical path for the gases to produce a vortex flow effecting concentrating of the dust particles at the periphery of the casing.

In a region upstream of the entrance of the gas into the turbine inlet chamber 20 there is provided means for extracting the dust particles which have been directed to the periphery of the casing by centrifugal action during flow through the helical separator section 34. Such means comprises a bleed passage 36 formed along the periphery of the separator section 34 in the region upstream of the turbine inlet chamber 20 where the gases are turned to enter the turbine wheel. As is best shown in FIGURE 2, the bleed passage 36 extends approximately through an arc of 90° along the periphery of the section 34 and increases in cross-sectional area gradually in the direction of flow. The bleed passage 36 leads directly from the periphery of the portion of the separator section 34 upstream of the turbine inlet chamber 20.

In operation, the dust-containing gas is delivered into the upstream end of the inlet nozzle section 32 wherein the gas is accelerated to a high velocity sufficient to provide effective centrifugal separation but below the critical wearing velocity of the separator parts. The gas passes from the downstream end of the nozzle section 32 through the helical passage provided by the casing section 34 wherein a vortex flow is produced with sufficient length of the flow path so that the dust particles are concentrated by centrifugal separation along the periphery of this helical conduit. As the gas enters the downstream end of the helical conduit 34, the dust particles will accumulate in the bleed passage 36 and will be bled from the unit by way of this passage as shown by the upper arrow in FIGURE 2. The remainder of the gas having the dust particles largely removed will be turned inwardly (as shown by the lower arrow in FIGURE 2) to enter the turbine inlet chamber 20. This gas will be directed approximately tangentially into and through the nozzles 22 to drive the turbine wheel 10 in accordance with the usual turbine operation, a final transformation into kinetic energy taking place in the nozzles.

It will be apparent that the combined turbine-separator unit in accordance with the invention takes advantage of the effective separation that can be achieved at high velocities within a centrifugal separator and utilizes this high velocity, with a minimum of energy loss, to drive a turbine which operates efficiently at high velocities to produce useful work in one form or another. This is achieved by the direct combination of a centrifugal dust separator with a turbine wherein the high velocity involved in the separation is not lost but is continued as a velocity of approach to the turbine nozzles to augment the spouting velocity to the periphery of the turbine wheel.

The meaning of the term "critical wearing velocity" as used herein will become evident by a consideration of the following discussion. It has been proposed to prolong the service life of systems comprising an inertial type separator and a turbine receiving the gas after it has passed through the separator by operating the system under conditions such that the erosion damage or wear in both the separator and the turbine are related so as to achieve a maximum of economy. This is achieved by regulating to a desired amount the separation that takes place in the separator before the gas is delivered to the turbine. In other words, if the separator were operated at a very high velocity so that essentially all of the dust was removed, there would be little wear in the turbine but the separator would be subjected to undue wear. It is the object of the above-discussed proposals to achieve a proper relationship between the wear in the separator and the wear in the turbine. The upper limit of the velocity of the gas in the separator which may exist to achieve a condition of particle separation and wear of the separator parts and which will result in the permissable erosion damage in both the separator and the turbine as discussed above is defined as the "critical wearing velocity."

Figure 3:
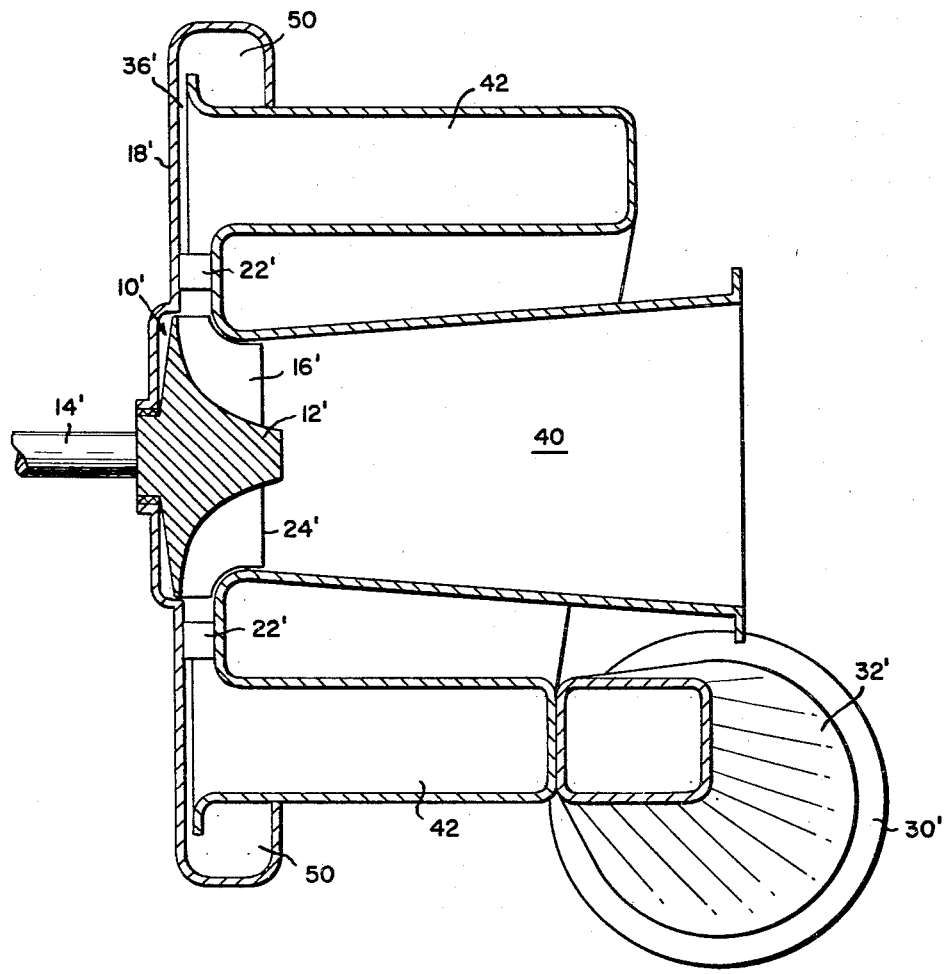
FIGURE 3 is an axial section through another form of combined dust separator and radial inflow turbine provided in accordance with the invention.

The turbine-separator unit in accordance with the invention shown in FIGURE 3 comprises a turbine section consisting of a radial inflow type of turbine essentially the same as that shown in FIGURE 1. The turbine section comprises a turbine wheel indicated generally at 10' and including a hub 12' secured to a shaft 14' for providing the mechanical output. The hub 12' carries the usual blades 16' which receive the flow of gas from the peripherally arranged guide vanes 22'. The gas leaves the exit edges 24' of the turbine blades 16' in a generally axial direction and enters a diffuser section 40 from which it passes to the turbine discharge. The turbine and diffuser are of conventional construction.

The dust separator section of the unit comprises a portion of the turbine casing 18' which defines an annular chamber 42 surrounding the nozzles and elongated axially. The annular chamber 42 is constructed with an inlet at an axially widened portion. The separator comprises an accelerator section 32' which receives the dust-containing gas through an inlet connection 30' and which is constructed to reduce in cross-sectional area in the direction of flow in order to accelerate the gas to the desired high velocity providing for good centrifugal separation as was discussed above in connection with the embodiment shown in FIGURE 1. The accelerator section 32' discharges the high velocity gas into the widest portion of the annular chamber 42 and in a direction along the circumferential extent of the annular chamber so that the gases move in a circumferential, helical path through the chamber 18. Thus, the gas is introduced into chamber 42 with components in both circumferential and axial directions and the gas stream will make several revolutions about the axis of the annular chamber 42 as it moves from the discharge of the accelerator to the downstream end of chamber 42 adjacent the nozzles 22'. Accordingly, the gas has a vortex flow imparted thereto and the dust particles are moved centrifugally to the periphery of the chamber. When the helically moving gas reaches the region of chamber 42 adjacent the nozzles 22', it will be turned radially inwardly to pass through the nozzles and the turbine wheel.

Means are provided for bleeding the portion of the gas containing the dust particles from the periphery of the chamber 42 in this region. Such means comprises a bleed passage 36' formed along the periphery of the chamber 42 at its downstream end in the region where the gases are turned radially inwardly to the turbine wheel. The bleed passage 36' extends circumferentially about the nozzles 22' and communicates with an annular extraction chamber 50. The annular bleed opening or passage 36' is provided with a cross-sectional area so as to keep the velocity high and to provide an ejector effect on the gases being bled from the chamber 42. The portion of the gases to be bled from the chamber 42 is dependent on the size of the bleed opening and can be controlled by and collected by suitable external valving.

From the foregoing description it will be apparent that various changes may be made without departing from the scope of the invention wherefore the invention is to be limited only in accordance with the following claims.

What is claimed is:

1. The combination comprising a centrifugal separator having an inlet for receiving gas containing dust particles and a separator portion for directing said gas in a circumferential pattern to produce a vortex type of flow whereby the dust particles concentrate at the peripheral portions of the gas steam, a turbine of a type which receives flow having a substantial radial inward component, said turbine having a turbine wheel, turbine nozzles directing gas to the turbine wheel with a radially inward component of flow, and an inlet chamber for directing gas radially inwardly to the turbine nozzles, said inlet chamber being arranged to receive directly gas discharged from said separator with maintenance of the high gas velocity existing in said separator as a velocity of approach to the turbine inlet chamber, and means for bleeding the dust particles in the peripheral portion of said gas stream from said separator prior to delivery of gas from said separator to said turbine inlet chamber, said separator comprising an accelerator portion upstream of said separator portion having a cross-section decreasing in the direction of flow for accelerating said gas to a desired high velocity.

2. The combination according to claim 1 wherein said separator comprises a helical conduit of several turns to cause the gas stream to make several revolutions.

3. The combination according to claim 1 wherein said separator comprises an annular chamber and said accelerator discharges the gas at a high velocity into the annular chamber in a direction having components circumferentially and axially of the chamber to produce a helical flow pattern through said separator.

4. The combination according to claim 3 wherein said bleed means comprises an annular opening surrounding the turbine wheel and at the downstream end of said annular chamber.

5. The combination according to claim 1 wherein said accelerator portion is constructed to provide a desired high velocity sufficient to produce effective centrifugal separation of the dust particles but below the critical wearing velocity of the separator.

6. The combination according to claim 1 wherein said bleed means comprises a passage formed along the periphery of said separator in the region upstream of the turbine inlet chamber, said passage extending tangentially of and in the direction of the circumferential flow of the gases passing through said separator and increasing in cross-sectional area gradually in the direction of flow.

References Cited

UNITED STATES PATENTS

| | | | |
|---|---|---|---|
| 1,631,660 | 6/1927 | Warren | 253—76 |
| 2,288,734 | 7/1942 | Noack | 253—76 X |

EVERETTE A. POWELL, JR., *Primary Examiner.*